US007797740B2

(12) United States Patent
Blom et al.

(10) Patent No.: US 7,797,740 B2
(45) Date of Patent: Sep. 14, 2010

(54) SYSTEM AND METHOD FOR MANAGING CAPTURED CONTENT

(75) Inventors: Jan Blom, Espoo (FI); Lorant Farkas, Budapest (HU); Severi Uusitalo, Hameenlinna (FI)

(73) Assignee: Nokia Corporation, Espoo (FI)

( * ) Notice: Subject to any disclaimer, the term of this patent is extended or adjusted under 35 U.S.C. 154(b) by 1254 days.

(21) Appl. No.: 11/275,470

(22) Filed: Jan. 6, 2006

(65) Prior Publication Data
US 2007/0162971 A1 Jul. 12, 2007

(51) Int. Cl.
*H04L 9/00* (2006.01)
*H04K 1/00* (2006.01)
(52) U.S. Cl. .................. 726/21; 726/4; 726/26; 713/182; 713/185; 713/186; 380/270; 455/550.1
(58) Field of Classification Search .............. 726/4, 726/21, 26; 713/182, 185, 186; 380/270; 455/550.1
See application file for complete search history.

(56) References Cited

U.S. PATENT DOCUMENTS

| 5,659,732 | A | 8/1997 | Kirsch |
| 5,748,954 | A | 5/1998 | Mauldin |
| 5,845,278 | A | 12/1998 | Kirsch et al. |
| 6,247,009 | B1 | 6/2001 | Shiiyama et al. |
| 6,332,193 | B1 * | 12/2001 | Glass et al. ............ 713/170 |
| 2003/0093693 | A1 * | 5/2003 | Blight et al. .......... 713/201 |
| 2003/0120940 | A1 | 6/2003 | Vataja |
| 2003/0159044 | A1 * | 8/2003 | Doyle et al. .......... 713/176 |
| 2004/0202382 | A1 * | 10/2004 | Pilu ..................... 382/276 |
| 2004/0207719 | A1 * | 10/2004 | Tervo et al. ........... 348/14.02 |

(Continued)

FOREIGN PATENT DOCUMENTS

WO 9109368 6/1991

(Continued)

OTHER PUBLICATIONS

Tsuruzoh Tachibanaya, "Description of Exif file format," printed from http://park2.wakwak.com/~tsuruzoh/Computer/Digicams/exif-e.html, Rev. 1.4, Feb. 3, 2001, 26 pages.

(Continued)

*Primary Examiner*—Kieu Oanh Bui
*Assistant Examiner*—Michelle Banihashemi
(74) *Attorney, Agent, or Firm*—Ditthavong Mori & Steiner, P.C.

(57) ABSTRACT

Provided are apparatuses and methods in a mobile communication and content capturing device for controlling ownership and use of captured content. A mobile device capturing content of a user of a target device may automatically request authorization to use and own the captured content from the target device and user. The mobile device may detect the target device by comparing metadata associated with the captured content with device information of a target device. Alternatively, the capture device may communicate with a server to facilitate the authorization request process. The capture device may further establish a piconet with one or more intermediate wireless devices to detect and request authorization from a target device outside of the capture device's wireless range. Tokens may further be implemented to reduce transmission and processing times of various communication information including authorization requests and content files.

48 Claims, 12 Drawing Sheets

U.S. PATENT DOCUMENTS

| | | |
|---|---|---|
| 2004/0236945 A1 | 11/2004 | Risan et al. |
| 2005/0050577 A1 | 3/2005 | Westbrook et al. |
| 2005/0177419 A1 | 8/2005 | Choi et al. |
| 2005/0188399 A1 | 8/2005 | Tischer |
| 2005/0285944 A1* | 12/2005 | Watanabe et al. ........ 348/207.1 |
| 2006/0026184 A1* | 2/2006 | Hewing et al. .............. 707/101 |
| 2006/0069756 A1* | 3/2006 | Singh et al. ................. 709/220 |
| 2007/0092104 A1* | 4/2007 | Lee ............................ 382/100 |
| 2007/0129012 A1* | 6/2007 | Snow ........................ 455/26.1 |
| 2007/0232347 A1* | 10/2007 | Persson et al. ........... 455/550.1 |
| 2008/0195863 A1* | 8/2008 | Kennedy .................... 713/168 |

FOREIGN PATENT DOCUMENTS

| | | |
|---|---|---|
| WO | 03004969 | 1/2003 |

OTHER PUBLICATIONS

International Search Report for International Application No. PCT/IB2007/000007, Mailed Jun. 18, 2007.

* cited by examiner

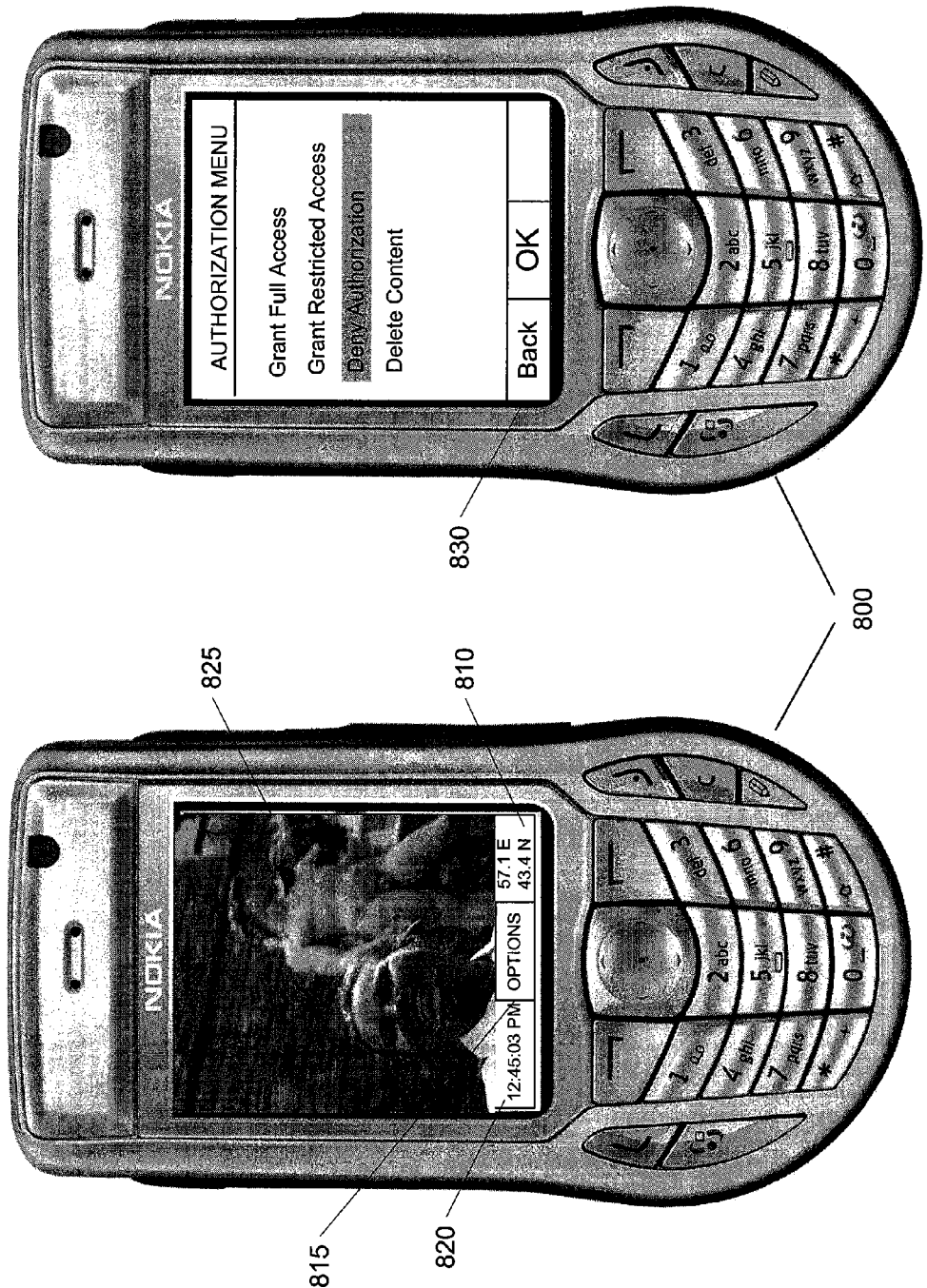

SYSTEM AND METHOD FOR MANAGING CAPTURED CONTENT

FIELD OF THE INVENTION

The invention relates generally to a method and a system of managing media content.

Specifically, the invention relates to a method and system for authorizing and exchanging information related to captured media content.

BACKGROUND OF THE INVENTION

Many devices exist today that allow a user to capture a variety of multimedia content including pictures, video and audio recordings. These devices have become increasingly mobile and compact to provide users the freedom to capture content in a variety of places and circumstances. For example, tourists often take pictures of scenery and people (e.g., themselves) to remember a vacation or trip. With the increasing popularity and widespread adoption of mobile telephones, the attractiveness of integrating multimedia capture capabilities with mobile telephones has grown. Such an integration of technologies permits a user to carry and utilize a single mobile device to both wirelessly communicate as well as to capture multimedia content. Thus, users are able to take a photograph or record a video segment and immediately transfer that content to a friend or family member via a wireless or cellular communications network. The subject of a photograph may also request that the photographer transfer the photograph to the subject for approval or previewing.

In one instance, a tourist may ask a friend to take a picture of him in front of the U.S. Capitol Building. After taking the picture with her own mobile device, the friend would have control over whether the picture is saved, deleted or used. As such, the subject of the photograph would be unable to dictate whether the photograph was suitable or appropriate for printing or saving. Even if the photographer transmitted the picture to the subject's mobile device, the subject still could not control the use or existence of the photograph on the photographer's device. In an alternate situation, a mobile device user may inadvertently capture a stranger while photographing a scene. The stranger would have no notice that such a photograph was taken and thus, no control over the use or distribution of his or her own image. For a variety of reasons, including security and privacy, the subject of any form of multimedia content may want the ability to exercise control over his or her image.

In addition, the transmission of captured media, especially larger files such as videos, can result in the quick depletion of a receiving device's storage resources. Thus, a receiving party would have to constantly manage the files and storage on his or her mobile device to maintain storage capacity. Furthermore, a large media file also requires more resources and time to transmit and render. As such, not only must a user wait for a file to finish transferring, the user would also have to wait while the media is rendered on the receiving device. Oftentimes, a receiving party is only receiving media content to determine whether or not he or she wants a copy. In such cases, the transfer and processing times of large media files may be wasted if the receiving party determines that he or she does not want the media.

For the foregoing reasons, a system and method for managing use of captured content is needed.

SUMMARY OF THE INVENTION

Embodiments of the invention provide a method and system of controlling ownership and authorization of captured media content. With such a system and method, the subject of captured content would be empowered to authorize and control the ownership of the captured content. The capturing device may send a content authorization request to one or more subjects of the captured content. Each user would then be able to preview the photograph or other content and decide whether to authorize the capturing device to use the content. As such, a user that is the subject of captured content may exercise control over the use and existence of the captured content. If authorization is denied, the capturing device may automatically delete the content from storage. Alternatively, if authorization is granted, the capturing device may store the content and allow the content to be transmitted, printed or otherwise used by the user of the capturing device. Such a feature may also be enabled or disabled according to a capturing device user's preferences.

In one aspect, a content capturing device may detect one or more devices having one or more predetermined characteristics (e.g., proximity of location) at the time a particular content was captured. A capturing device may determine such a list of devices from which to request authorization using wireless networking methods. In one example, the capturing device and other mobile devices in proximity to the capturing device may have BLUETOOTH wireless capabilities. Thus, the capturing device may detect and communicate with the other BLUETOOTH wireless devices within a wireless range. Alternatively, the capturing device may communicate with a wireless or cellular server that may determine a list of matching devices based on stored information that matches a set of received parameters.

In another aspect of the invention, the captured content may contain metadata that includes a variety of information related to the captured content. Such metadata may include the time the content was captured, the duration of the content (i.e., video content), the size of the content and/or authorization information. For example, if a subject of captured content authorizes the use and storage of the captured content, such authorization may be embedded within the metadata of a content file storing the content. Such authorization information may be used to determine whether the content may be published or printed by a third party photograph printer.

In yet another aspect of the invention, a subject of captured content may provide qualified authorization for the use of the captured content. For example, a subject of a photograph may determine that the photographer may print the photograph up to 10 times or that the photographer may only use the photograph in its digital format (i.e., no printing). Other restrictions may be implemented such as an expiration of use date and the like.

In another aspect of the invention, users receiving captured content may preview the content file and the associated metadata through a representative token. The tokens may be of a limited size to ensure quick transfers and fast rendering times. The tokens may contain a sample of the captured content (e.g., thumbnail image, brief clip of a video) as well as some or all of the metadata associated with the content. This permits the user to make a quick decision as to whether or not he or she would like a copy of the content. If the user does want a copy, a complete version of the media may be requested using a request token and the media file may be subsequently transferred. Tokens may further be used in order to search for similar or identical content on a target device. For example, a user who wants to locate images similar to a picture of Buckingham Palace may send a query token containing various media data to one or more target devices. The target devices would then use the query token to determine if any of its media files are similar to the image associated with the query token. The representative tokens of captured content may be further be stored on a target device for later use. In one example, a user may view or browse a gallery of stored tokens and subsequently request the full content file corresponding to one of the tokens. Stored tokens may have a variety of other uses as well.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIGS. 8A & 8B illustrate preview and authorization request interfaces according to an illustrative embodiment of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
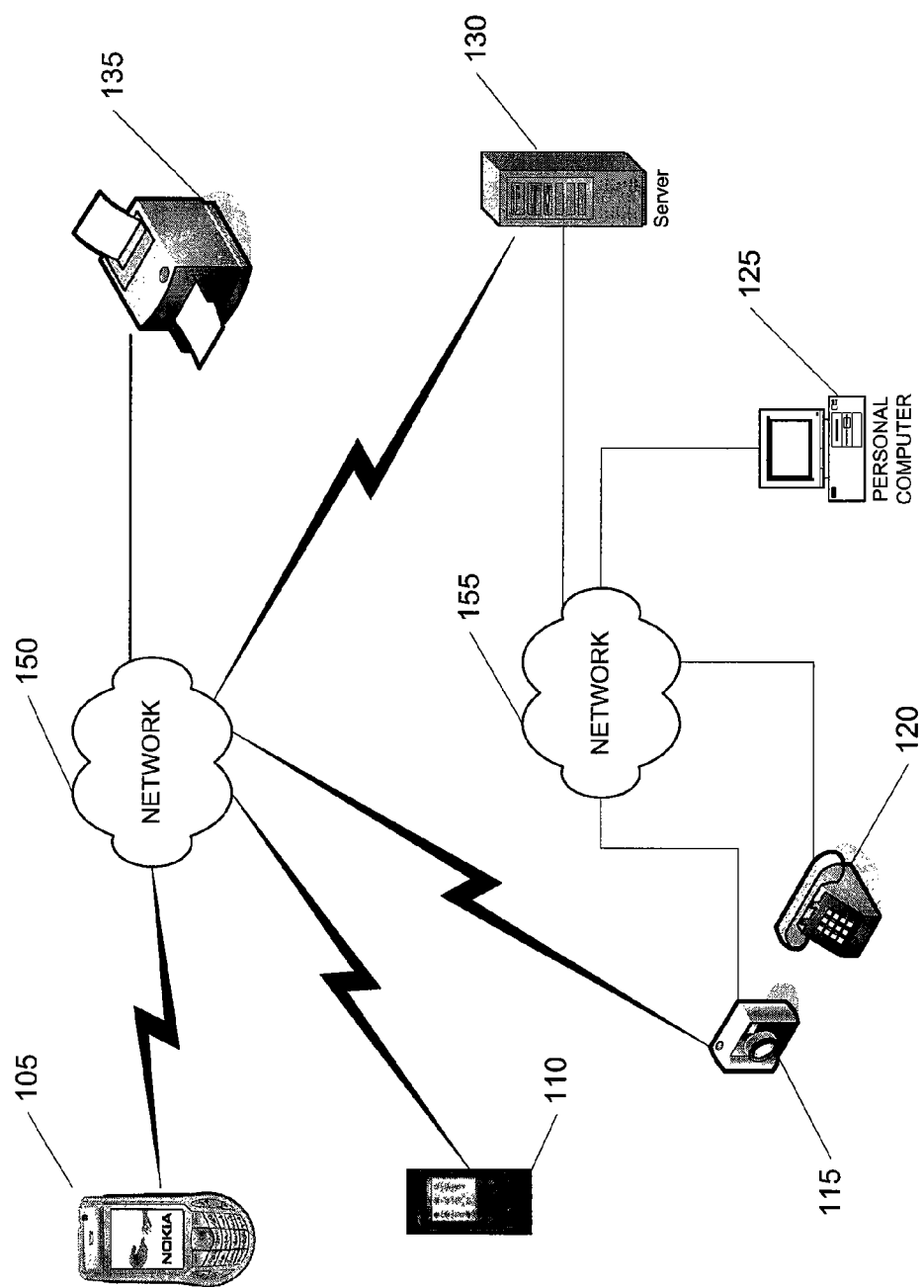
FIG. 1 illustrates a block diagram of a communication network in which various systems and methods of the present invention may be implemented.

FIG. 1, describing one embodiment of the invention, illustrates a block diagram of a communication network in which various systems and methods of the present invention may be implemented. The communication network may include both wired and wireless components. Such wireless components may include mobile telecommunication devices 105, personal data assistants (PDAs) 110, digital cameras 115 and other wireless computing devices. The wired components may include a network server 130, network printing providers 135, personal computers (PCs) 125, multimedia telephones 120 and the like. The wireless and wired components may communicate through a variety of methods including a cellular network 150 and/or a wired computer network 155. For example, a cellular telephone 105 may transmit data through a wireless cellular network 150 to a network server 130. The network server 130 may then retransmit the data to a land-line telephone 120 through a line-based telephone network 155. Alternatively, the network server 130 may forward the data to a Voice Over IP (VOIP) capable communications device through a computer network. The computer network may include wireless networks such as a wireless local area network (WLAN) or wired networks such as a Local Area Network (LAN).

The communication devices may further capture, store and transmit a variety of data types including audio, video and text. In one example, a mobile telephone 105 may include a digital camera component. Thus, the mobile telephone 105 may capture, store and transmit both audio and video data. Communication devices may transmit multimedia data using any of several protocols that are well known in the art. Examples of transmission protocols that support multimedia data include Internet Protocol (TCP/IP), BLUETOOTH, GSM, CDMA and the like. BLUETOOTH systems, in particular, may form a piconet of up to eight different BLUETOOTH-enabled wireless devices. A piconet allows a single master device to facilitate the communications between the other slave devices. One of skill in the art will appreciate that there exists a plethora of both wired and wireless transmission protocols that may be used in the systems and methods described herein. Furthermore, multimedia data that is initially sent using one protocol may be repacketized or recomposed to adapt to another network protocol. For example, a cellular phone 105 may transmit a photo and accompanying audio to a PC located on an IP network using CDMA transmission methods. Upon reaching the network server 130, the server 130 may repacketize the multimedia data to conform the transmission packet architecture to that used by the destination device (i.e., IP). This process insures cross-network compatibility.

Figure 2A:
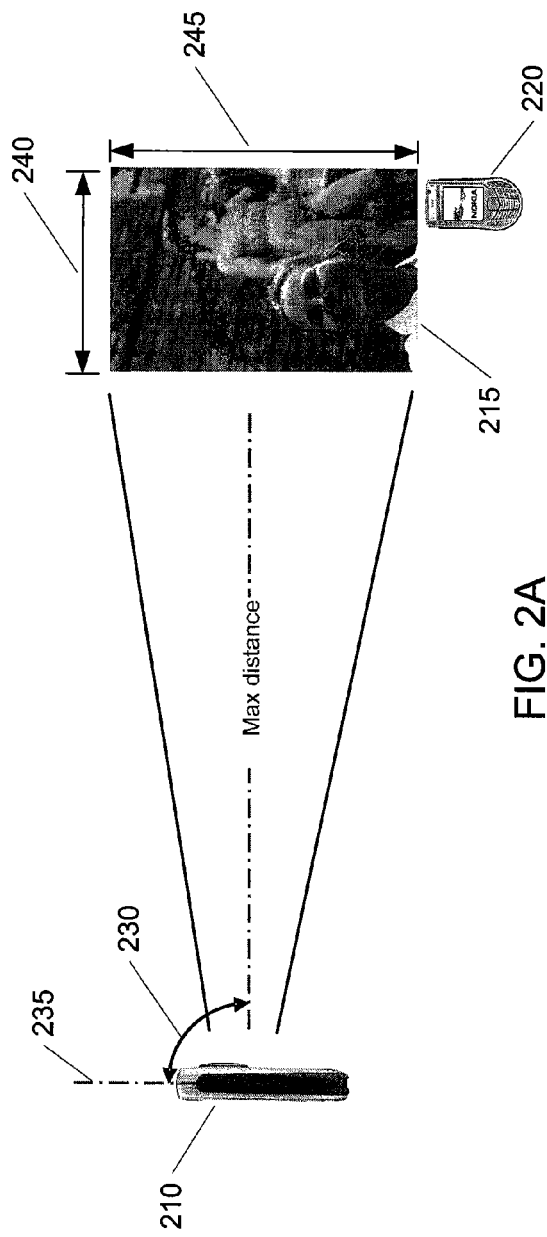
FIG. 2A illustrates an side view of an exemplary operating environment in which a mobile content capture device implementing one or more systems and methods of the present invention may be used.
Figure 2B:
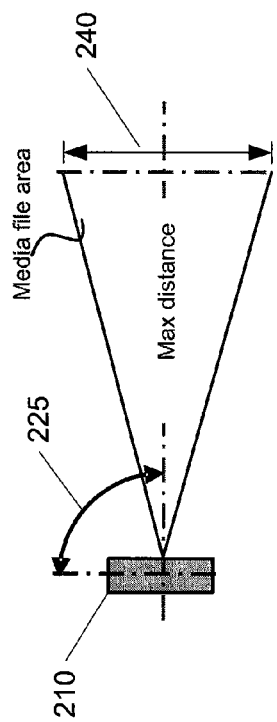
FIG. 2B illustrates a top view of the exemplary operating environment of FIG. 2A.

FIGS. 2A & 2B, describing further embodiments of the invention, illustrate different view of an exemplary operating environment in which a mobile device implementing one or more systems and methods of the present invention may be used. A user carrying a mobile capture device such as, for example, a mobile phone 210 with an integrated digital camera may use the device 210 in a variety of situations including on vacation, during a business trip or at a sporting event. Other forms of mobile capture devices may include portable audio recorders, video cameras and digital cameras. In the above example, the user can use the mobile phone 210 to record media content such as video, audio, still images and the like.

Often, the recordation of media content will contain the image or audio of one or more subjects 215. In one particular example, a user may take a photograph of his sister 215 in front of a particularly memorable location (e.g., the Eiffel Tower) to commemorate the occasion. In such a situation, his sister 215 would be a subject of the captured media content (i.e., photograph). In other examples, the captured content may contain the image or audio of one or more additional subjects that may or may not be familiar with the content capturer.

Additionally, during the capturing stage, the capture device 210 may record other information that relates to one or more characteristics of the recorded content. In one embodiment, the capture device may detect positional coordinates using, for example, a Global Positioning System (GPS). The stored content may thus include a latitude and longitude of where the image was taken. In addition, the capture device 210 may also include one or more components that are able to determine an elevation 230 and/or an azimuth 225 of the capture device 210 in relation to one or more reference points or axes at the time the content was captured. The elevation 230 of the capture device 210 may reflect an angular distance measured based on the horizon. For example, a gyroscopic unit of capture device 210 may measure the elevation 230 of the device 210 in relation to a "level" position defined by the earth's gravitational field. Other information that may be stored or associated with the captured content includes a capture size and a maximum capture distance. A maximum capture distance may be a preset range defined by the user, a default value or some other limitation (e.g., a maximum focus distance of a digital camera). Alternatively, the maximum capture distance may be defined by the distance to the farthest captured object, as determined by a range detection component such as a laser range finder. In FIGS. 2A & 2B, the photograph 215 is confined to a rectangular capture area defined by a vertical viewing size 245 and a horizontal viewing size 240. The captured content 215 may be stored with data specifying the corresponding vertical 245 and horizontal 240 dimensions. Other types of characteristic information may include a frequency range for audio content, color data for image content, a recordation period for video data, a zoom ratio for video or image content and a time stamp. One of skill in the art will appreciate that a multitude of other characteristic information may be stored instead of or in addition to the information described above. To facilitate the use and association of related data, the captured content may be stored in a structure that allows for the embedding of metadata. Using such a storage scheme, captured device 210 may detect various types of content data (e.g., positional information, location data and audio and video characteristics) and associate the information as metadata with the captured content.

In some circumstances, a subject 215 of captured content may wish to control the use and/or existence of his or her own captured image or voice. Thus, the subject 215 of the captured content may carry or use a mobile device 220 capable of receiving and rendering data of one or more media types. The capture device 210 may automatically transmit the captured content either directly or indirectly to the subject's mobile device 220 for approval and authorization upon capturing the content. Direct methods include infrared transfers, BLUETOOTH networking methods and other proximity transfer technologies. Alternatively, the capture device 210 may transmit the captured content indirectly via a cellular network, a wired network or other networks that use a third-party device to coordinate and facilitate the transfer. Such transfer methods, as they relate to aspects of the invention, will be described in further detail below.

Figure 3A:
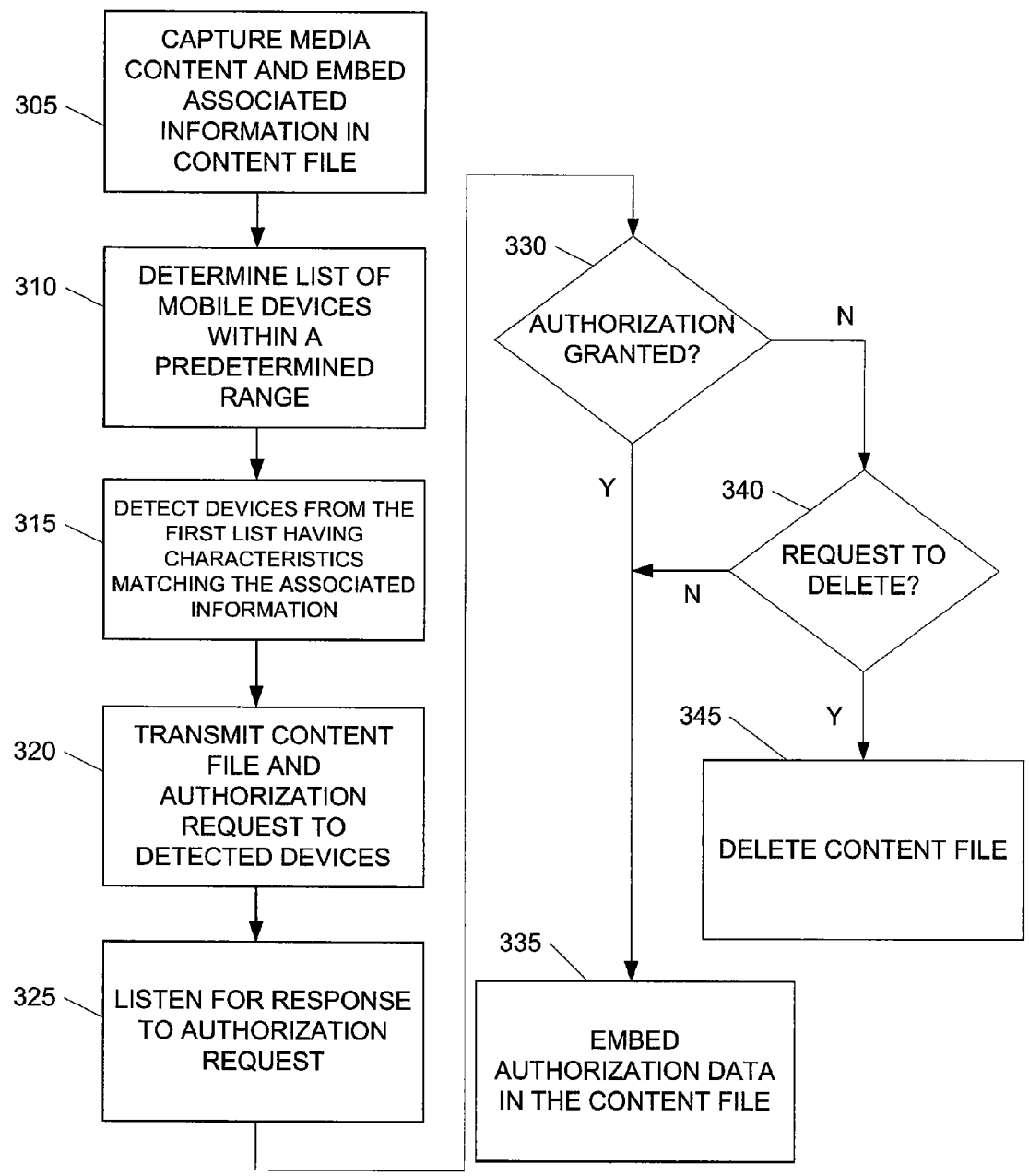
FIG. 3A is a flow chart showing an exemplary method for controlling ownership of media content according to an illustrative embodiment of the present invention.

Current methods of authorizing the use or storage of captured content by the subjects of the captured content require that the subjects manually request the content and approve it. As discussed previously, the ultimate decision of use and storage is left to the content capturer (i.e., user of the capture device). FIG. 3A, describing one embodiment of the invention, is a flowchart showing an exemplary method for requesting authorization for captured content from one or more devices. In step 305, the capturing device captures media content and determines one or more characteristics of the captured content or of the capturing device (e.g., longitude, latitude, zoom ratio, time stamp). The characteristics and other information may be stored as metadata and associated with the captured content in a content file. Once the content has been captured and the relevant information has been determined, the capture device may determine a list of one or more target devices that are within a predetermined range in step 310. This range may be defined by variety of factors such as the wireless detection range of the capture device or a maximum capture distance specified in the associated metadata. The performance of steps 305 and 310 are not restricted by the order illustrated in FIG. 3A and may be performed in interchangeable order (i.e., step 310 may be performed before step 305 and vice versa).

In step 315, the capture device determines a second list of target devices from which to request authorization to use the captured media content. The second list of devices is selected based on whether a detected device has characteristics matching or similar to those of the content file. In one example, a capturing device takes a photograph at a first location in the direction of a stranger who is walking 40 feet away carrying a mobile device. In storing the photo, the capture device embeds metadata in the content file to indicate a capture range of 50 feet. The 50 foot capture range may reflect a focusing distance limitation or a wireless range limitation of the capture device. Since the stranger is within the capture range, the capturing device may add the target device (i.e., the stranger's mobile device) to the list of devices from which to request authorization. The capturing device may use different or additional characteristics to further determine authorizing devices. In another example, the capture device may compare the time at which a target device was at a given location with the time stamp of the media content captured by the capturing device.

Figure 3B:
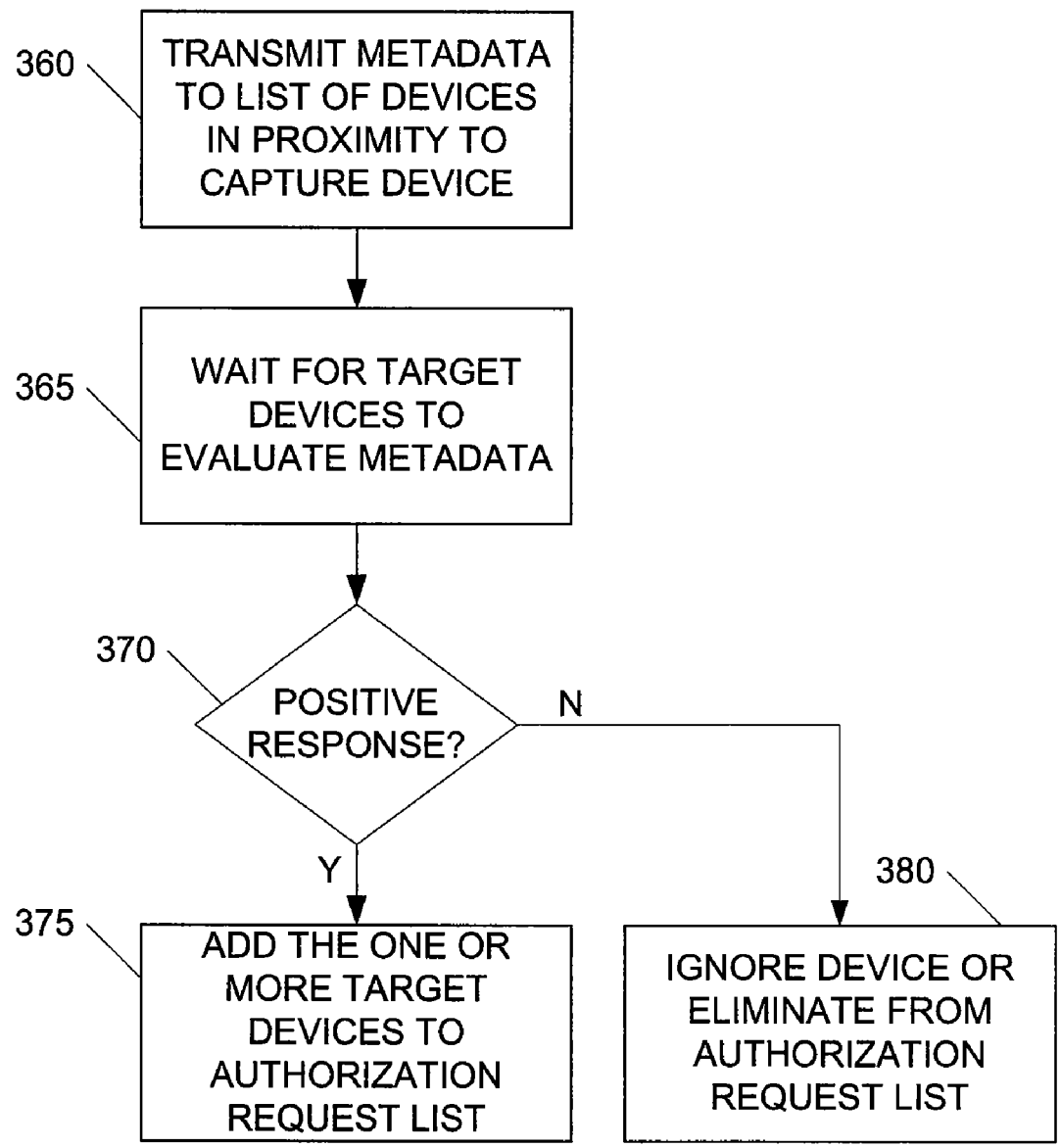
FIG. 3B is a flow chart showing an exemplary method for detecting one or more authorization devices according to an illustrative embodiment of the present invention.

In one embodiment, the capture device may, in step 315, determine an authorization list based on proximity of target devices. FIG. 3B, describing one embodiment of the invention, illustrates a flowchart of an exemplary method for detecting and determining a list of target devices that are within a predetermined proximity to the capturing device at the time of content capture. FIG. 3B is meant to illustrate step 315 in additional detail according to an illustrative embodiment. As described, the capturing device embeds metadata comprising information associated with the captured content in a content file. In step 360, the capturing device transmits the metadata to the list of target devices determined according to step 310. The target devices may then evaluate the received metadata to determine if the information matches their own stored data in step 365. A target mobile device may periodically detect and record a variety of information including device location, altitude, time and combinations thereof in memory for this purpose. If a target device's data matches the metadata received from the capturing device, the capture device may receive a positive response including a request for the media content file from the target device in steps 370. In one example, metadata transmitted from the capturing device may include a set of coordinates and a timestamp. The receiving target device may retrieve its past location data by searching for a timestamp in temporal proximity to the timestamp of the received metadata. Additionally, the metadata may include angles (e.g., elevation) and measurements that represent a direction of the captured content (i.e., relative to the captured device). A target device may determine whether it was within the specified angles and distance of the capture device and respond accordingly. Such a process may involve using geometric calculations to determine if a target device's latitude, longitude and elevation fall within a capture area of a capture device having a specified latitude, longitude, elevation and direction. In step 375, the capturing device may add any target device that responds affirmatively to the list of devices from which authorization is to be requested. This step is performed automatically by the capturing device upon receiving an affirmative response from a target device. A user may, instead, manually control and determine whether to send an authorization request to one or more target devices that provide an affirmative response. However, if a target device either does not respond or responds in the negative, the capturing device may ignore the device or eliminate it from the authorization list in step 380.

Returning to FIG. 3A, once the capture device determines a list of authorizing devices, the capture device subsequently transmits the captured content file and an authorization request to each of the one or more authorizing devices in step 320. The capturing device then awaits a response in step 325 to the authorization request while each of the authorizing devices receives and renders the captured content. An authorizing device may respond with a variety of options including authorize, refuse authorization, delete the content file or provide qualified authorization. Upon receiving a response to the authorization request, a capture device may determine whether authorization was granted or denied in step 330. If the capture device receives a response granting authorization, the capture device may embed such authorization in the content file in step 335. Alternatively, if the capture device receives, as in step 340, a delete response, the content file may be automatically deleted from the capture device in step 345. In one variation, the response may allow restricted authorization of the content file. In other words, a user may use the content subject to certain restrictions specified by a user of an authorizing device. Such restrictions may include a time restriction, a purpose restriction, a payment requirement, a frequency of use restriction and/or combinations thereof. The capture device may embed the restrictive parameters in the content file, as illustrated in step 335. The content file transmitted to the authorizing device may either be kept for future use or automatically deleted once a response is sent. Such a determination may be made in accordance with user preferences or other considerations.

In an alternate embodiment, the capture device may initially transmit the entire content file (including the captured content and associated metadata) along with the authorization request to one or more target devices regardless of whether they are authorizing devices. Using such a method, a target device may immediately render the captured content upon determining that it is an authorizing device without having to separately request the content file from the capture device. Similarly, the target device may view and respond to the authorization request without having to initiate additional transmissions or communications to receive the authorization request. Those devices that find the content file to be irrelevant may simply ignore the authorization request and delete the content file.

Figure 4A:
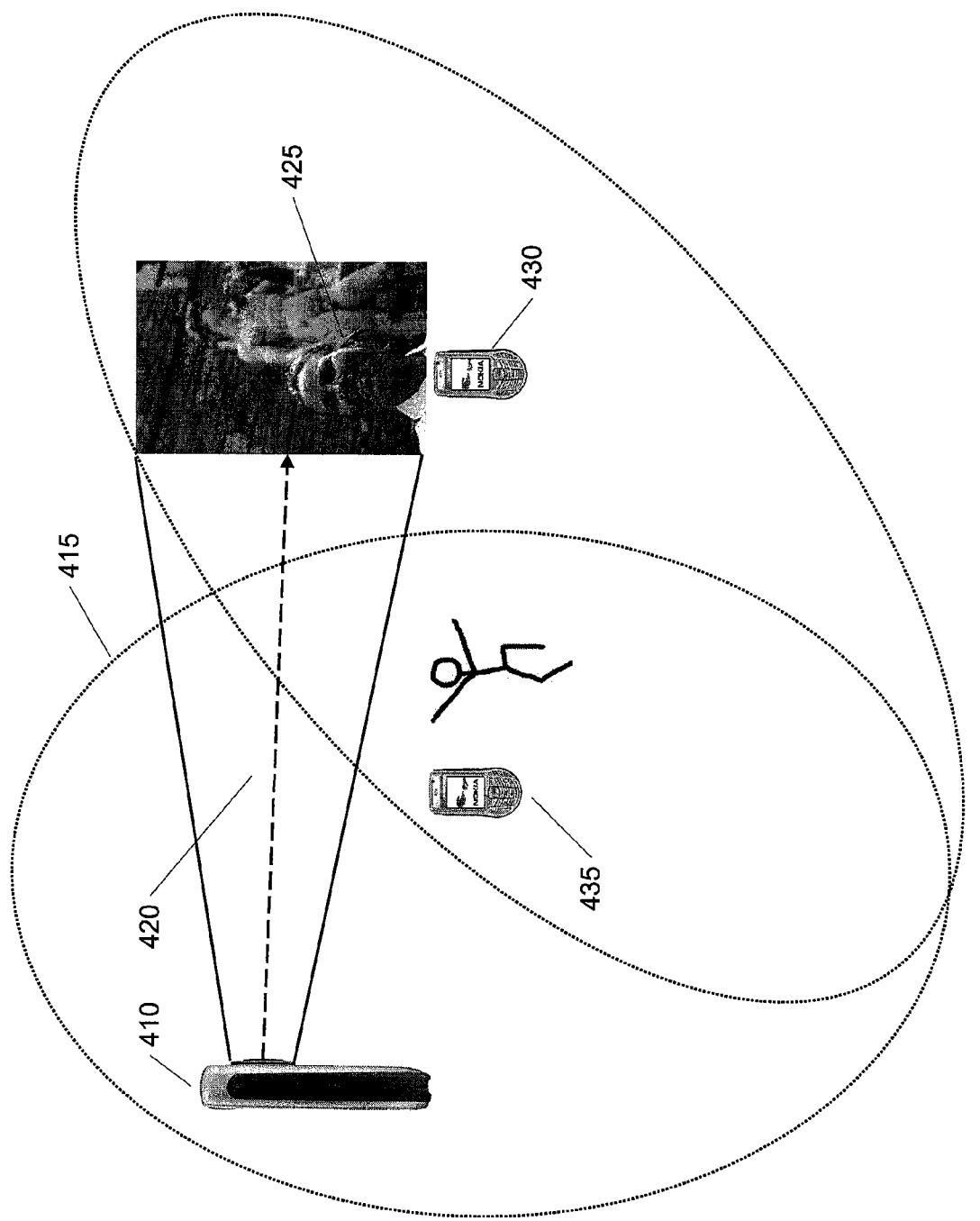
FIG. 4A illustrates an operating environment in which one or more devices are outside a detection range of a capture device according to an illustrative embodiment of the present invention.
Figure 4B:
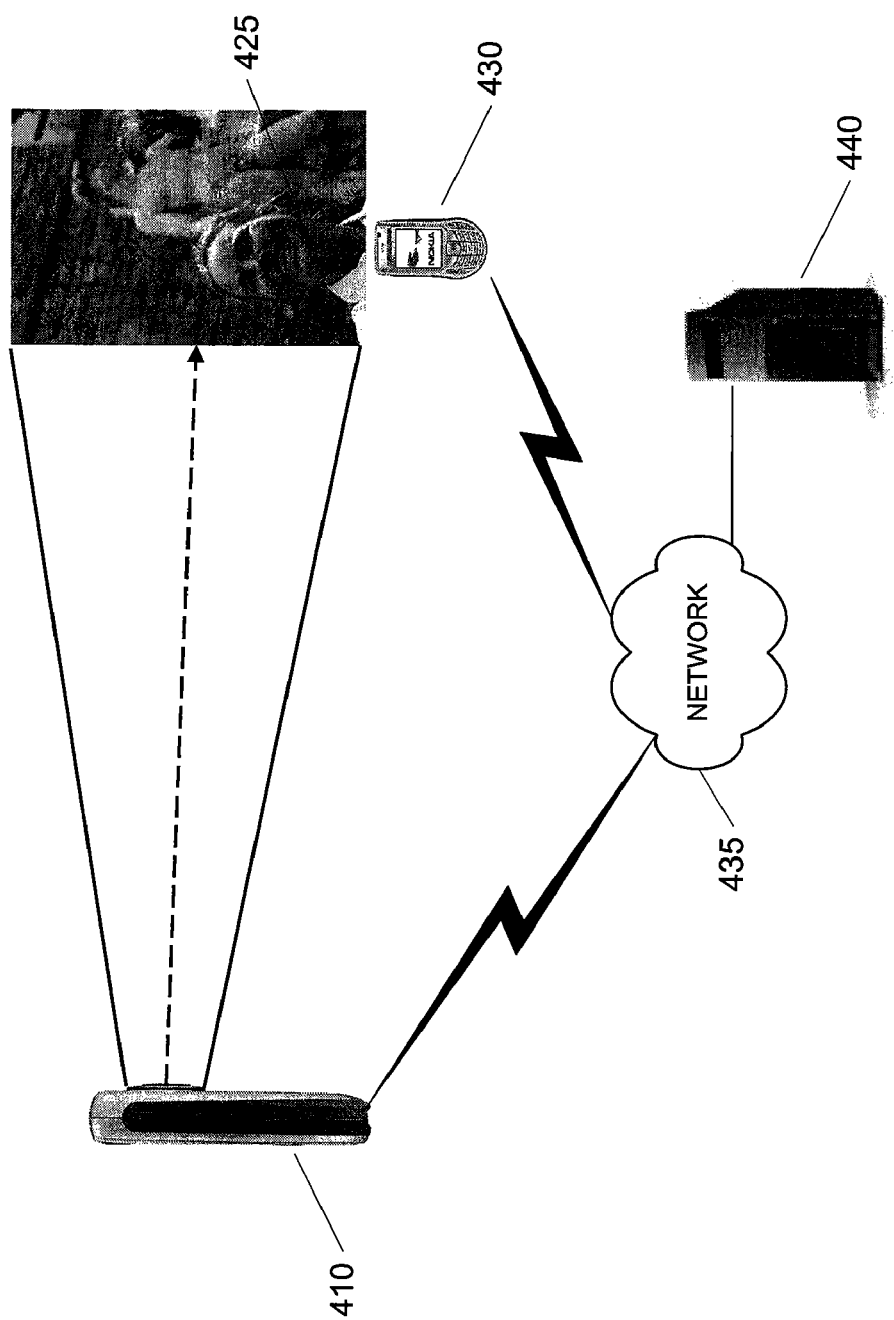
FIG. 4B illustrates an operating environment in which one or more devices lack short range wireless detection capabilities according to an illustrative embodiment of the present invention.

FIGS. 4A & 4B, describing further embodiments of the invention, illustrate operating environments in which one or more devices 430 are outside a detection range of a capture device 410 according to an illustrative embodiment of the present invention. In FIG. 4A, the wireless detection range 415 of the capture device 410 may be smaller than a content capture range 420 of the capturing device 410. In other words, the capturing device 410 may be able to capture a subject (i.e., a target) 425 at a greater distance than the device 410 is able to detect wirelessly. Wireless technologies such as BLUETOOTH and WLAN have detection ranges that are limited by a variety of factors including both power capacity and antenna capabilities and device class. Thus, a foreign device 430 of a subject 425 captured by the capturing device 410 may be outside the relevant wireless range 415. However, a third-party device 435 within the wireless range 415 of capture device 410 and the subject's device 430 may act as a link between the subject's device 430 and the capture device 410. In one implementation using BLUETOOTH transmission standards, the capture device 410, the third-party device 435 and the subject's device 430 may form a piconet. The third-party device 435 may act as the master device for facilitating communications between two or more slave devices (i.e., the subject's device 430 and the capture device 410).

In an alternative scenario, FIG. 4B depicts a system that includes a capture device 410 and a subject device 430 where either both or one of the devices 410 & 430 do not have proximity-based wireless capabilities. However, the devices 410 & 430 may be connected to a communication network 435 and have the ability to transmit and receive data via a network server 440. The network server may consist of a variety of components including a PC and/or a smartphone running an mApache server. Thus, even if the capture device 410 includes peer-to-peer wireless components and the target device (i.e., subject's device) 430 does not, it may still detect the target device 430 using the network server 435 as a communication conduit. In one embodiment, the network server 440 may store data corresponding to each of the devices 410 & 430 using the network 435 and/or network server 440. For example, the target device 430 may detect its own location and a timestamp at a predefined interval. The target device 430 may then forward this data to the network server 440 for storage in order to reduce its own memory load. Alternatively, the network server 440 may periodically request and store updated data from the devices 410 & 430.

Figure 5:
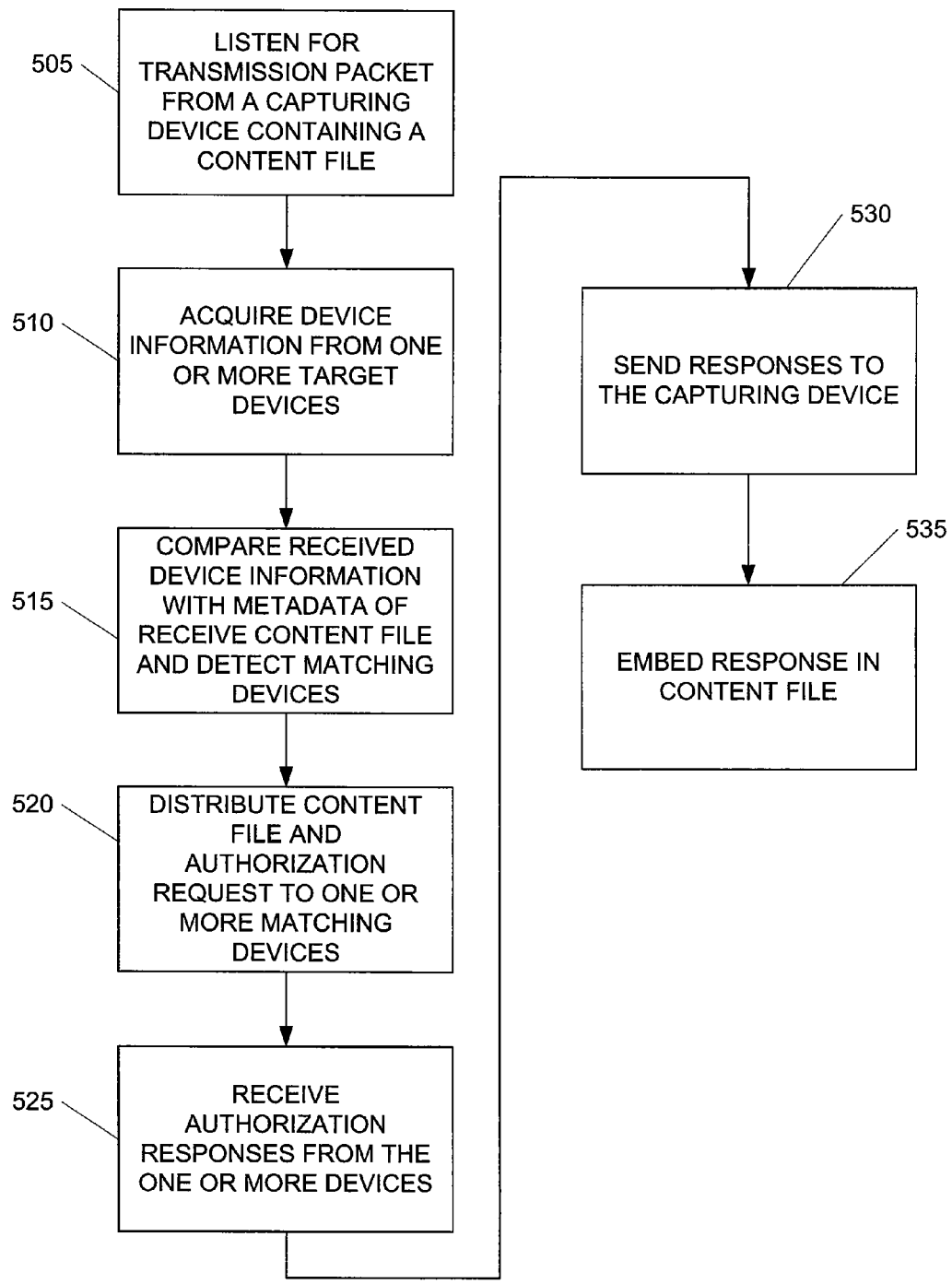
FIG. 5 is a flow chart showing an exemplary method for controlling ownership using a third-party device according to an illustrative embodiment of the present invention.

FIG. 5, describing one embodiment of the invention, is a flow chart showing an exemplary method for exercising ownership control through a third-party device according to an illustrative embodiment. Such a method could be used in an operating environment such as the one described in FIG. 4B to overcome device detection obstacles. The third-party device (e.g., network server) acts as a communications conduit between a capture device and a target device allowing the capture device to determine whether authorization is necessary from the target device.

A network server (i.e., a third-party device) initially sits in a listening mode, waiting for a transmission packet from a capturing device in step 505. The transmission packet received from the capturing device may contain captured content, an authorization request and metadata to reduce the number of transmissions. As described with respect to FIG. 3B, the metadata, content file and authorization request may be sent separately or in various combinations as they are requested by the network server or target device. The metadata may include a variety of content or device information such as location, altitude, azimuth, elevation, zoom ratio and/or combinations thereof. The authorization request may be a uniform message constructed to request authorization from one or more target devices. In step 510, the network server may acquire device information from one or more target devices known to the network server. The network server may acquire a target device's information in numerous ways including requesting the information from the target device or listening for periodic updates transmitted independently by the target device. The target device, in turn, may detect its own characteristics (e.g., location, timestamp, altitude) at periodic intervals as described previously. Alternatively, the target device may only determine its characteristics upon receiving a request by the network server or another device. In step 515, the network server compares the received device information with the metadata of the content file to determine whether one or more target devices match the data associated with the captured content. A "match" may be defined by a predetermined threshold value. The threshold value may be a percentage of characteristics matching or some other measuring rubric. The various characteristics and device information may be weighted to provide greater importance to some factors and less importance to others. The network server may optionally provide the list of matching devices to the capturing device. The step of determining a list of authorizing devices may also be performed at the target device, as described in FIG. 3B, by transmitting at least the metadata to the target device for evaluation. The network server may compose a list based upon the positive and negative responses from the target devices.

Returning to FIG. 5, upon determining the list of one or more target devices having matching characteristics, the network server then distributes the content file as well as the authorization request to the one of more devices in step 520. The content file is transmitted so that the target device may render the image, video or audio and for a user of the target device to determine whether to grant or deny authorization. In one or more embodiments, the network server may transfer a thumbnail or otherwise reduced media file instead of the full media file. This may reduce the transfer and authorization time of especially large media files such as videos and high-quality images. In step 525, the network server listens for and receives authorization responses from the one or more target devices. The authorization responses may be transmitted from the one or more target devices in response to a user's manual determination or automatically by the target device. An automatic authorization response may be generated by a rule stored on the target device. For example, a rule may instruct the target device to deny any authorization requests to which a user has not manually responded in a predetermine amount of time. The authorization responses may be directly retransmitted to the capture device in step 530. In one embodiment, the network server may send the one or more received authentication responses to the capture device at predefined intervals. The network server may also send the one or more authentication responses once all of the target devices have responded. Silence from a particular device may indicate a default response of either granting or denying authorization. Alternatively, silence may provide authorization to the capturing device for a predetermined amount of time before authorization must be requested again.

In step 535, the network server may further embed the one or more authentication responses in the content file and transmit the content file back to the capturing device. In one variation, the server may instruct the capture device to embed the responses in the content file itself. If the server embeds the authentication data, the server may instruct the capture device to replace any other versions of the content file with the one transmitted by the server. On the other hand, if the capturing device embeds the authentication data, the server may request confirmation that the content file was, in fact, updated.

Figure 6:
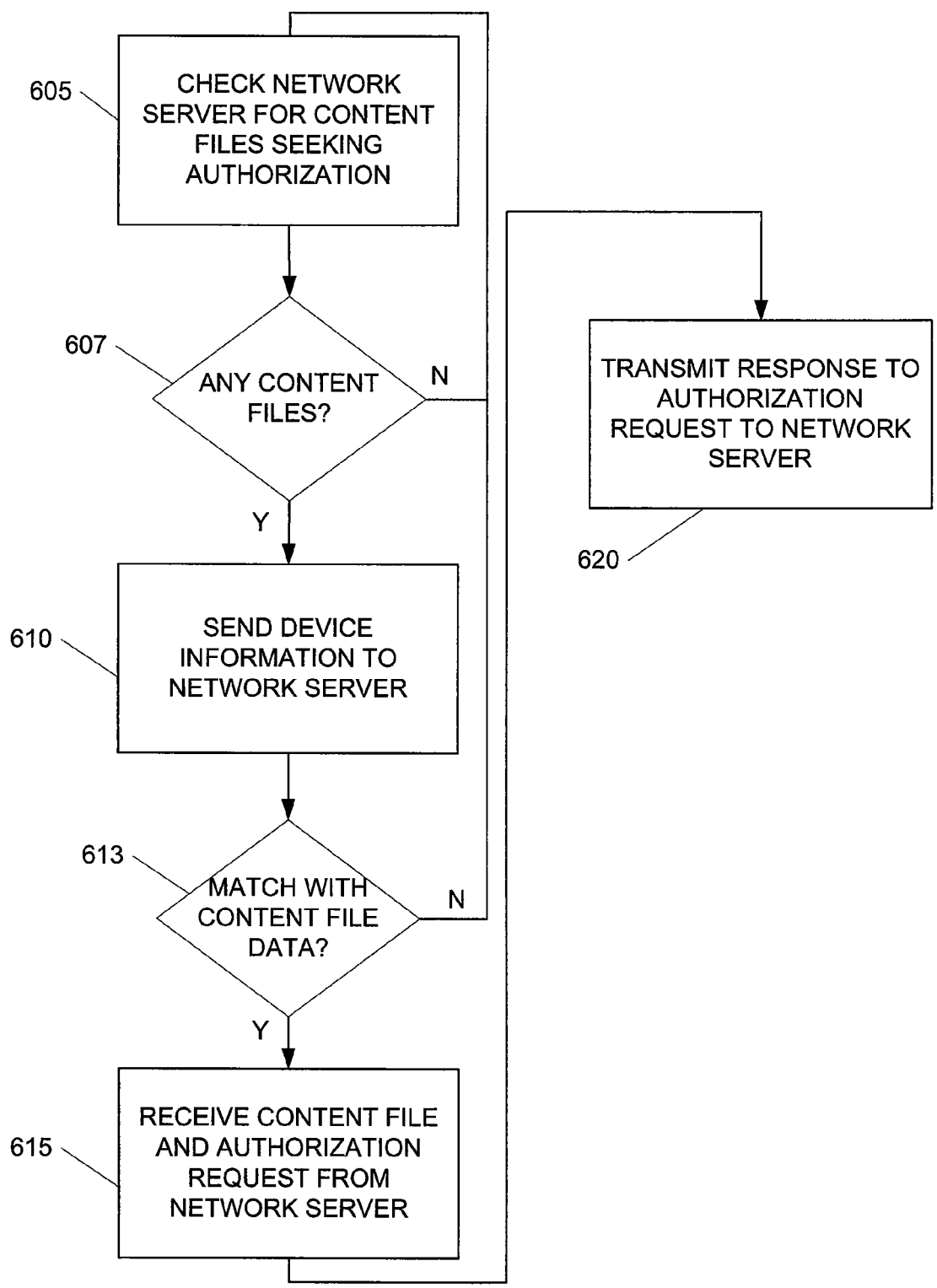
FIG. 6 illustrates another exemplary method for controlling ownership of captured content according to an illustrative embodiment.

FIG. 6, describing one embodiment of the invention, illustrates another exemplary method for controlling ownership of captured content according to an illustrative embodiment. In step 605 of FIG. 6, a target device may check if the network server is storing any content files that require authorization. Thus, the network server might not initiate any comparison or determination of authorizing devices until requested to do so by a target device. If the network server determines that it is storing a content file requiring authorization, the target device may send its information to the network server to determine if the target device should be an authorizing device in steps 607 & 610. Such a determination may be made in step 613 using methods described previously, including matching metadata in the content file with target device information. In response to a positive determination, the content file and an authorization request are transmitted to the target device for rendering and authorization in step 615. A user of the target device may then decide whether to authorize the capture device's use of the content file and respond accordingly in step 620. In one example, a user of the target device may decide that the picture is too blurry and issue a delete command to the network server. The network server would then instruct the capture device to delete the content file and, optionally, request confirmation.

Figure 7:
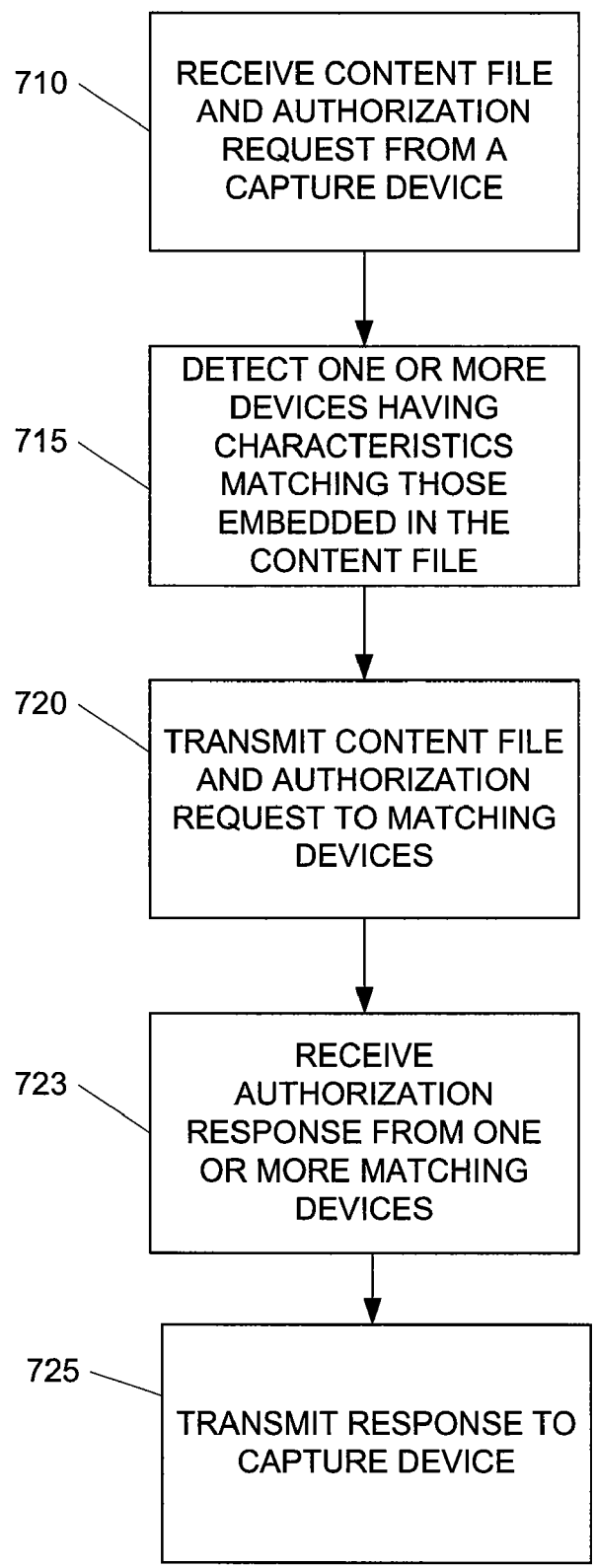
FIG. 7 is a flow chart showing an exemplary method for controlling ownership in the environment described in FIG. 4A using a peer-to-peer network according to an illustrative embodiment of the present invention.

FIG. 7, describing one embodiment of the invention, is a flow chart showing yet another exemplary method for controlling ownership in the environment. In FIG. 7, the method allows for the authorization of content by devices in a peer-to-peer network environment as described in FIG. 4. In other words, a capture device and a target device are not within the wireless detection ranges of one another. In such an instance, an intermediary device in the peer-to-peer network may be used to facilitate authorization requests and responses between the capture device and the target device, respectively.

In step 710, the capture device may transmit a content file to the intermediate device along with an authorization request. Since the capture device is unable to communicate with the target device due to wireless range limitations, the capture device may request that the intermediary device convey the authorization request to the target device. More particularly, the intermediary device may act as a proxy for the capture device and detect one or more target devices that have matching characteristics. In step 715, the intermediate device detects one or more target devices that have characteristics matching those embedded in the content file. The intermediate device then transmits the content file (or a representative portion thereof) and the authorization request to one or more matching target devices in step 720. As with the previous methods described herein, the user of the target device may then determine whether to provide authorization for the content to the capture device. Upon receiving an authorization response from the target authorizing device in step 723, the intermediate device subsequently communicates the response to the capture device in step 725. Alternatively, the intermediate device may modify the authorization data of the content file and transmit the content file back to the capture device along with the authorization response.

FIGS. 8A & 8B, describing further embodiments of the invention, illustrate a preview and authorization request interface according to an illustrative embodiment of the present invention. FIG. 8A illustrates a preview pane in which a user of a target authorizing device may render and view the captured content 825. The user interface may include resizing features, brightness/darkness adjusters and other image modification options. The user interface may further display a timestamp 820, location information 810 and the like along with the image 825. The source (not shown) of the captured content may also be identified. Additionally, the user may be presented with an option 815 to view authorization options or to respond to the authorization request. In FIG. 8B, an authorization response screen is illustrated with a menu of possible responses. For example, a user could request that the content file be deleted or specify that the file may not be printed. An option 830 on the menu may further allow the user to switch to the preview pane illustrated in FIG. 8A.

In one or more alternative embodiments, the content authorization methods and systems described herein may further implement tokens to facilitate the transmission and sharing of media content. For example, an authorization request or a response thereto may be transmitted in the form of one or more tokens. Tokens are generally small data structures representing media content that include metadata related to the media content or a device owner. The metadata may include information related to a time and place of creation, contact information of the device owner, a content type and the like. The metadata of a token may further provide information corresponding to the people or devices that were in proximity to the capturing device at the time of content capture. Additionally, the token may include a representative portion of the media content to provide a receiving user a preview of the content. For example, if the captured media was a digital image, the token may include a thumbnail of the digital image. In another example, a representative clip of video content may be included in a token instead of the entire video. Tokens may be transmitted using methods similar to those previously described. In addition, a token may be downloaded or distributed to foreign mobile devices through a personal web page or a web server or any type of network medium.

Thus, rather than transmitting the entire content file to a target device for preview and authorization, a capture device may send just a token to increase transfer speed and improve rendering time. In one alternative embodiment, a target device user may request a copy of the full content file from the capture device using a request token. The request token may contain sufficient information for the capture device to identify the requested content file. For example, a thumbnail or video clip might not be included in a request token since the capture device already has the full content file. A capture device, upon receiving a request token, may locate the content file corresponding to the provided identification information and transmit the file to the target device. A capture device may, on the other hand, request information from the requesting device in return for the content file. The requested information may include the identity of the requesting device user and/or similar content. As such, the token system may be used as a way to trade information or media content by enticing users through the use of tokens.

Figure 9A:
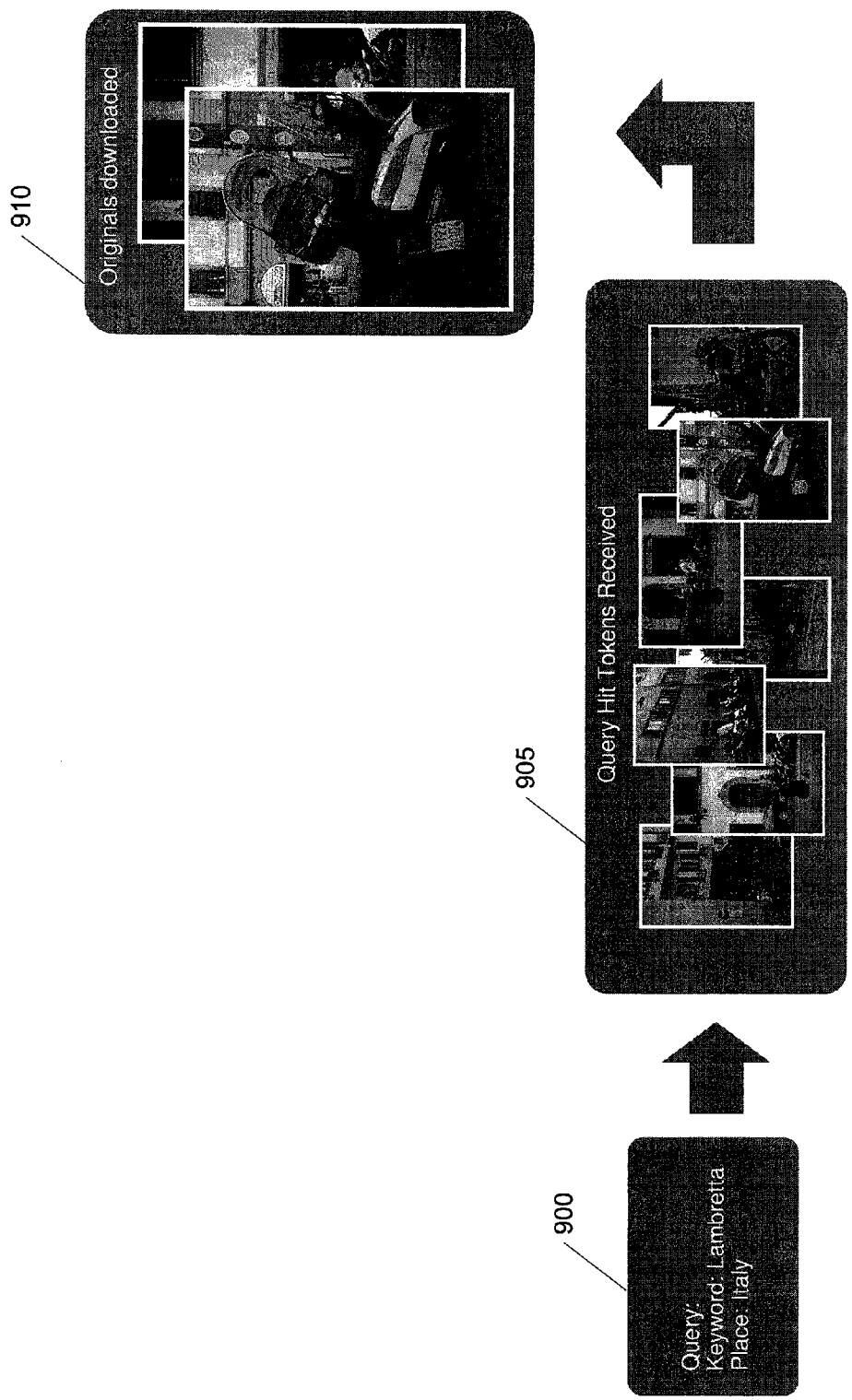
FIGS. 9A & 9B are diagrams illustrating the process of querying one or more target devices according to an illustrative embodiment.

A target device user may further search for additional images or media content that is similar to content currently stored on the target device. The currently stored content may have been captured by the target device, provided in a received token or derived from a received content file. FIG. 9A, describing one embodiment of the invention, illustrates a diagram of using query tokens to retrieve matching content from one or more target devices. To conduct a search for similar or identical content, the request device may issue a query token 900 to one or more receiving devices using various transmission techniques. In one example, the one or more receiving devices are determined based on a proximity to the requesting device at the time of content capture. The query token 900 may further include information or parameters for the search including a keyword (e.g., "Lambretta"), time of capture, a location (e.g., "Italy") and a content type. Each of the receiving devices may then conduct a search on their local content databases to determine whether they have any content matching the specified parameters. If the receiving device finds one or more matches, the receiving device may then issue one or more query hit tokens 905 identifying the matching content. As discussed previously, a request device may issue a request token for any of the content identified by the query hit tokens 905. In response to the request token, the original content files 910 may be downloaded from the corresponding target device. In addition, tokens may also contain a variety of fields and parameters such as a popularity indicator that may be increased with each request for the corresponding content file. The tokens may further include logs that provide information regarding times of access, request and/or modification.

Figure 9B:
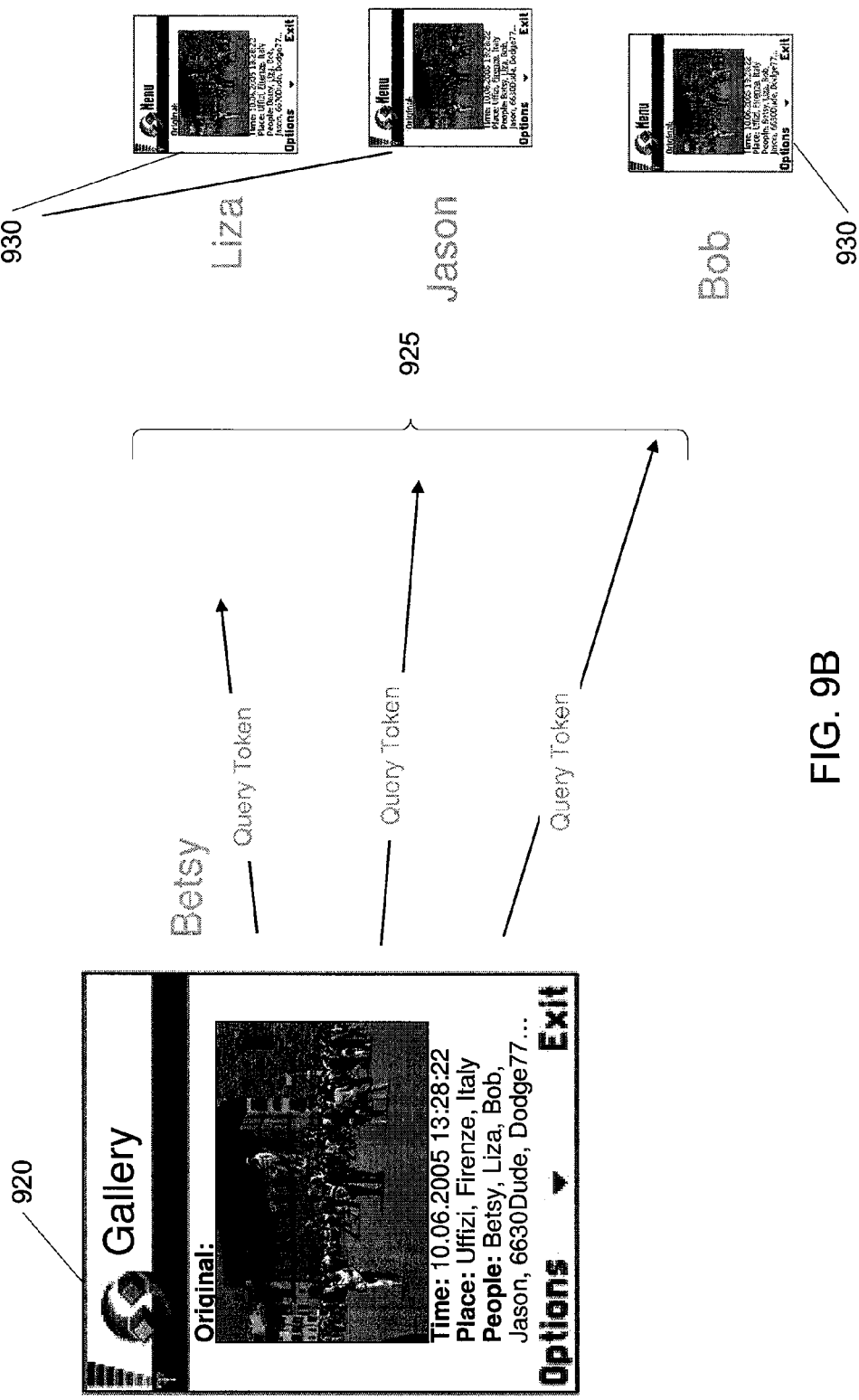

FIG. 9B, describing one embodiment of the invention, is another diagram illustrating query token usage between multiple device users. Mobile device 920 of user 'Betsy' may initially render an image of a location in Italy as well as provide the metadata information (i.e., place, people and time). The mobile device 920 may identify the people (i.e., Liza, Jason and Bob) in the picture based on proximity detection and device identification as discussed previously. Betsy may decide that her image is not sufficiently clear and request matching images from other users. In one embodiment, Betsy may choose from a list of people that the device 920 has detected as being in proximity at the time the picture was taken. Betsy may then select one or more of the people from which to request matching images. Query tokens 925 are then transmitted to each of the devices 930 of the selected people. Devices 930 may then evaluate the metadata and/or content data to determine whether they are storing matching images. If one or more of the devices 930 are storing a matching image, a query hit token may be returned as described in FIG. 9A.

In addition a device user may occasionally decide to modify, add or delete content from a content database stored on the device. In such instances, the tokens transmitted to other devices corresponding to the content may require modification or updating (e.g. the tokens may include requests for other device and user). For example, originally transmitted tokens may contain identification information allowing a receiving device to request the full content file from a transmitting device based on the identification data. Thus, if the name of a content file has changed, the original token may need to be updated to reflect the name change. As such, a transmitting device (i.e., the device storing the modified or deleted content file) may issue an update token or removal token for a particular content file if that content file has been modified or deleted, respectively. An update token may either provide new information to replace old information in the original token or, the update token may simply replace the original token entirely. A removal token, on the other hand, may instruct a receiving device to delete the original token from the receiving device's database. Alternatively, a token may be assigned an expiration time. At the expiration time, the token must be updated or be deleted from the database.

In other instances, a token may contain a constant unique identifier associated with a content file. Thus, even if the path of a content file were to change on the transmitting device, the unique identifier of the content file would remain the same. The tokens on a receiving device would not need to be updated since the unique identifier may still be used to request the corresponding content. The unique identifier may constitute a randomly assigned alphanumeric code, a generated identification number or a unique name. The unique identifier may also be evaluated as a hash value calculated based on the corresponding content.

In further instances, a token may contain an application or an applet that is needed for rendering the media content, and/or to execute the requests that token includes. Upon receiving such a token, a target device may automatically launch the application to render or otherwise process the media content. In other instances, a user of a target device may be given the option of launching the embedded application or applet or executing a pre-existing application. Additionally, tokens may be stored for later use on a target device. For example, a user may wish to collect tokens of captured content for later viewing or browsing. At such a later time, the user may request the full content file corresponding to one or more of the stored tokens. Numerous other uses of stored tokens may also be implemented in the systems and methods described.

Each of the methods and systems for requesting authorization to control and use captured content may further implement an expiration time or distance feature. In one example, a capturing device may continuously search for target devices from which to request authorization as long as it is within a certain distance of the capturing location. Alternatively, the capturing device may continue the search until a predetermined time is reached. Other parameters may also be used to limit the duration of a capturing device's search for authorizing devices including a limit to the number of authorizing devices. In addition, a user of a capture device or of a target device may enable or disable the authorization features described herein. Thus, a user would not be forced to delete a content file if the user does not so desire.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method comprising:
   causing, at least in part, storage of metadata of media content captured by a capture device in a content file;
   wirelessly detecting by the capture device at least one device in proximity to the capture device;
   determining at the capture device whether a user of the at least one device is possibly captured in the media content due to the proximity at the time of media content capture based on whether a location characteristic of the at least one device matches the metadata;
   causing, at least in part, transmission of a request for an authorization for using the media content from the capture device to the at least one device; and
   causing, at least in part, reception of a response to the request for the authorization from the at least one device at the capture device.

2. The method of claim 1, wherein storing the media content in a content file comprises causing, at least in part, actions that result in storage of metadata with the media content in the content file, wherein the metadata comprises information associated with the captured content and location information of the capturing device when the media content is captured.

3. The method of claim 2, wherein wirelessly detecting at least one device is carried out via infrared or Bluetooth, and
   wirelessly detecting at least one device in proximity to the capture device further comprises:
   requesting device information from the at least one device in proximity to the capture device; and
   comparing the device information of each of the at least one device with the metadata in the content file.

4. The method of claim 2, wherein wirelessly detecting at least one device in proximity to the capture device further comprises:
   causing, at least in part, actions that result in transmission of the metadata to the at least one device; and
   causing, at least in part, actions that result in reception of a response from at least one device indicating whether the device was in proximity to the capture device at a time the media content is captured.

5. The method of claim 2, wherein the metadata comprises at least one of a maximum capture distance of the capture device, a pointing angle of the capture device, a pointing direction of the capture device, global positioning system (GPS) coordinates of the capture device, a frequency range of the media content, a zoom ratio of the media content, a time stamp of the media content, when the media content is captured.

6. The method of claim 2, wherein transmitting the request further comprises:
   generating a token comprising the metadata and at least a portion of the media content;
   causing, at least in part, actions that result in storage of the request in the token; and
   causing, at least in part, actions that result in transmission of the token to the at least one device.

7. The method of claim 1 further comprising causing, at least in part, actions that result in storage of the response in the content file.

8. The method of claim 1, wherein the response to the request further comprises a request token, wherein the request token comprises a request for the media content and identification information of the user of the at least one device.

9. The method of claim 1, wherein the capture device comprises a mobile phone with an integrated digital camera, and the at least one device is a mobile device.

10. The method of claim 1, wherein transmitting the request further comprises transmitting the content file or a thumbnail of the content file to the at least one device.

11. An apparatus comprising:
    at least one processor; and
    at least one memory including computer program code;
    the at least one memory and the computer program code configured to, with the at least one processor, cause the apparatus to perform at least the following,
    causing, at least in part, storage of metadata of media content captured by a capture device in a content file;
    wirelessly detecting by the capture device at least one device in proximity to the capture device;
    detecting at the capture device whether a user of the at least one device is possibly captured in the media content due to the proximity at the time of media content capture based on whether a location characteristic of the at least one device matches the metadata;

causing, at least in part, transmission of a request for an authorization for using the media content from the capture device to the at least one device; and causing, at least in part, reception of a response to the request for the authorization from the at least one device at the capture device.

12. The apparatus of claim 11, wherein the apparatus is further caused to cause, at least in part, actions that result in storage of the response in the content file.

13. The apparatus of claim 11, wherein the apparatus is within the capture device that includes a digital camera, and the at least one device is a mobile device.

14. The apparatus of claim 11, wherein the apparatus is further caused to cause, at least in part, actions that result in storage of metadata in the content file, wherein the metadata comprises information associated with the media content and location information of the capturing device when the media content is captured.

15. The apparatus of claim 14, wherein the apparatus is further caused to:
generate a token comprising the metadata and a portion of the media content;
cause, at least in part, actions that result in storage of the request in the token; and
cause, at least in part, actions that result in transmission of the token to the at least one device.

16. The apparatus of claim 14, wherein the apparatus is further caused to:
request device information from the at least one device in proximity to the apparatus; and
compare the device information of each of the at least one device with the metadata in the content file.

17. The apparatus of claim 14, wherein the metadata comprises at least one of a maximum capture distance of the capture device, a pointing angle of the capture device, a pointing direction of the capture device, Global Positioning System (GPS) coordinates of the capture device, a frequency range of the media content, a zoom ratio of the media content, a time stamp of the media content, when the media content is captured.

18. The apparatus of claim 14, wherein the metadata comprises at least one of an azimuth and elevation of the apparatus when the content was captured.

19. The apparatus of claim 11, wherein the apparatus is within the capture device that includes one or more wireless communication components.

20. The apparatus of claim 11, wherein the apparatus is further caused to cause, at least in part, actions that result in transmission of the content file to the at least one device.

21. An apparatus comprising:
at least one processor; and
at least one memory including computer program code;
the at least one memory and the computer program code configured to, with the at least one processor, cause the apparatus to perform at least the following,
causing, at least in part, reception of metadata of media content captured by a capturing device;
determining, at the other device in proximity to the capturing device, whether a user of the other device is possibly captured in the media content due to the proximity at the time of media content capture based on whether a location characteristic of the other device matches the received metadata;
in response to a positive determination, requesting by the other device for a content file corresponding to the media content; and causing, at least in part, reception of the content file and a request for an authorization for using the media content at the other device from the capturing device;

causing, at least in part, device display of the media content at the other device;

causing, at least in part, reception of a response to the request for the authorization at the other device; and causing, at least in part, transmission of the response to the request for the authorization from the other device to the capturing device.

22. The apparatus of claim 21, wherein the response to the request comprises a request to delete the content file.

23. The apparatus of claim 21, wherein the response to the request comprises one or more restrictions on using the content file.

24. The apparatus of claim 21, wherein the apparatus is further caused to display an audio recording through one or more speakers of the apparatus.

25. The apparatus of claim 21, further comprising one or more wireless communication components, wherein the apparatus is within the device that is a mobile device.

26. The apparatus of claim 21, wherein the metadata comprises location information of the capturing device at the time the media content is captured.

27. The apparatus of claim 21, wherein the metadata includes a location of the capturing device when the media content is captured by the capturing device and wherein the characteristic of the apparatus includes a location of the apparatus when the media content is captured by the capturing device.

28. A method comprising:
causing, at least in part, reception of metadata of media content and a request for an authorization for using the metadata of the media content captured by a capturing device from the capturing device at an apparatus;
determining by the apparatus at least one device in proximity to the capturing device based on whether a location characteristic of the at least one device matches the metadata, thereby determining whether a user of the at least one device is possibly captured in the media content due to the proximity at the time of media content capture;
causing, at least in part, transmission of the request for the authorization from the apparatus to the at least one detected mobile device;
causing, at least in part, reception of a response to the request for the authorization at the apparatus from the at least one detected mobile device; and
causing, at least in part, transmission of the response from the apparatus to the capturing device.

29. The method of claim 28, wherein receiving the request from the capturing device further comprises receiving the media content captured by the capturing device.

30. The method of claim 29, wherein transmitting the request further comprises transmitting the content file to the at least one detected mobile device.

31. The method of claim 28, wherein the response to the request comprises a request to delete content captured by the capturing device, wherein the apparatus is server or a mobile device.

32. The method of claim 28, wherein wirelessly detecting at least one mobile device in proximity to the capturing device further comprises:
causing, at least in part, actions that result in reception of metadata of the media content captured by the capturing device from the capturing device;

requesting device information from the at least one device in proximity to the capturing device; and comparing the device information of each of the at least one device with the metadata.

33. The method of claim 32, wherein the metadata comprises location information of the capturing device.

34. The method of claim 32, wherein the metadata comprises an azimuth and elevation of the capturing device at the time the media content is captured.

35. An apparatus comprising:

at least one processor; and at least one memory including computer program code, the at least one memory and the computer program code configured to, with the at least one processor, cause the apparatus to perform at least the following, causing, at least in part, reception of metadata of a request for an authorization for using the metadata of media content captured by a capturing device from the capturing device;

determining by the apparatus at least one device in proximity to the capturing device based on whether a location characteristic of the at least one device matches the metadata, thereby determining whether a user of the at least one device is possibly captured in the media content due to the proximity at the time of media content capture;

causing, at least in part, transmission of the request for the authorization from the apparatus to the at least one detected mobile device;

causing, at least in part, reception of a response to the request for the authorization at the apparatus from the at least one detected mobile device; and causing, at least in part, transmission of the response from the apparatus to the capturing device.

36. The apparatus of claim 35, wherein the apparatus is further caused to:

extract metadata of the media content captured by the capture device;

request device information from the at least one device in proximity to the capture device; and compare the device information of each of the at least one device with the metadata.

37. The apparatus of claim 36, wherein the metadata comprises location information of the capture device, wherein the apparatus is server or a mobile device.

38. The apparatus of claim 36, wherein the metadata comprises an azimuth and elevation of the capture device at the time the content was captured.

39. A method comprising:

causing, at least in part, reception of metadata of media content captured by a capturing device at another device;

determining, at the other device in proximity to the capturing device, whether a user of the other device is possibly captured in the media content due to the proximity at the time of media content capture based on whether a location characteristic of the other device matches the received metadata;

in response to a positive determination, requesting by the other device for a content file corresponding to the media content; and causing, at least in part, reception of the content file and a request for an authorization for using the media content at the other device from the capturing device;

causing, at least in part, device display of the media content at the other device;

causing, at least in part, reception of a response to the request for the authorization at the other device; and causing, at least in part, transmission of the response to the request for the authorization from the other device to the capturing device.

40. The method of claim 39, wherein the metadata includes a location of the capturing device when the media content is captured and wherein the characteristic of the device includes a location of the device when the media content is captured by the capturing device.

41. The method of claim 39, wherein the metadata includes a location of at least one object captured in the media content and wherein the characteristic of the device includes a location of the device at a time the media content is captured.

42. The method of claim 39, wherein the response includes a request to delete the content from the capturing device, wherein the device that is a mobile device.

43. A computer-readable non-transitory storage medium carrying one or more sequences of one or more instructions which, when executed by one or more processors, cause an apparatus to at least perform the following steps:

causing, at least in part, reception of metadata of media content and a request for an authorization for using the metadata of the media content captured by a capturing device from the capturing device at an apparatus;

determining by the apparatus at least one device in proximity to the capturing device based on whether a location characteristic of the at least one device matches the metadata, thereby determining whether a user of the at least one device is possibly captured in the media content due to the proximity at the time of media content capture;

causing, at least in part, transmission of the request for the authorization from the apparatus to the at least one detected mobile device;

causing, at least in part, reception of a response to the request for the authorization at the apparatus from the at least one detected mobile device; and causing, at least in part, transmission of the response from the apparatus to the capturing device.

44. The computer-readable storage medium of claim 43, wherein the apparatus is caused to further perform: receiving the media content captured by the capture device.

45. The computer-readable storage medium of claim 44, wherein the apparatus is caused to further perform:

extracting metadata from the content file;

requesting device information from the at least one device in proximity to the capture device; and comparing the device information of each of the at least one device with the metadata.

46. A computer-readable non-transitory storage medium carrying one or more sequences of one or more instructions which, when executed by one or more processors, cause an apparatus to at least perform the following steps:

causing, at least in part, storage of metadata of media content captured by a capture device in a content file;

wirelessly detecting by the capture device at least one device in proximity to the capture device;

detecting at the capture device whether a user of the at least one device is possibly captured in the media content due to the proximity at the time of media content capture based on whether a location characteristic of the at least one device matches the metadata;

causing, at least in part, transmission of a request for an authorization for using the media content from the capture device to the at least one device; and causing, at least in part, reception of a response to the request for the authorization from the at least one device at the capture device.

47. The computer-readable storage medium of claim 46, wherein the request includes metadata of the content including at least one of: a time the media content is captured by the capture device and a location at which the media content is captured by the capture device.

48. The computer-readable storage medium of claim 46, wherein the response includes a request to delete the content from the capture device.

* * * * *